United States Patent
Mamin et al.

(10) Patent No.: US 8,760,653 B2
(45) Date of Patent: Jun. 24, 2014

(54) ASSEMBLY FOR MONITORING POWER OF RANDOMLY POLARIZED LIGHT

(75) Inventors: Alexey M. Mamin, Siegen (DE); Vladimir Zuev, Siegen (DE)

(73) Assignee: IPG Photonics Corporation, Oxford, MA (US)

( * ) Notice: Subject to any disclaimer, the term of this patent is extended or adjusted under 35 U.S.C. 154(b) by 1022 days.

(21) Appl. No.: 12/581,568

(22) Filed: Oct. 19, 2009

(65) Prior Publication Data

US 2011/0090501 A1    Apr. 21, 2011

(51) Int. Cl.
*G01J 4/00* (2006.01)
*G01J 1/22* (2006.01)

(52) U.S. Cl.
CPC .......................................... *G01J 1/22* (2013.01)
USPC .......................................... 356/370; 356/364

(58) Field of Classification Search
None
See application file for complete search history.

(56) References Cited

U.S. PATENT DOCUMENTS

| | | | | |
|---|---|---|---|---|
| 3,463,575 A * | 8/1969 | Gates | ...................... | 359/489.11 |
| 5,719,702 A * | 2/1998 | Decker | ................... | 359/485.06 |
| 5,784,202 A * | 7/1998 | Noguchi | ....................... | 356/491 |
| 5,875,054 A * | 2/1999 | Onoda et al. | ............... | 359/341.2 |
| 6,816,261 B2 * | 11/2004 | Patel et al. | ..................... | 356/365 |
| 7,095,497 B2 * | 8/2006 | Kishikawa et al. | ........... | 356/364 |
| 7,161,675 B2 * | 1/2007 | Kishikawa et al. | ........... | 356/364 |
| 7,180,051 B2 * | 2/2007 | Takeuchi et al. | ............. | 250/225 |
| 7,307,722 B2 * | 12/2007 | Martinelli et al. | ............ | 356/365 |
| 8,116,000 B2 * | 2/2012 | Plant | ........................ | 359/485.06 |
| 2002/0176079 A1* | 11/2002 | Mueller | ....................... | 356/364 |
| 2003/0189711 A1* | 10/2003 | Orr et al. | ...................... | 356/484 |
| 2010/0189438 A1* | 7/2010 | Hoshida | ........................ | 398/65 |

* cited by examiner

*Primary Examiner* — Gregory J Toatley
*Assistant Examiner* — Juan D Valentin, II
(74) *Attorney, Agent, or Firm* — Y. Kateshov, Esq.; T. King, Esq.

(57) ABSTRACT

A unit for measuring a power of randomly polarized light beam is configured with spaced first and second beam splitters having respective reflective surfaces which face one another and configured to sequentially reflect a fraction of randomly polarized beam which is incident upon the first splitter. The beam splitters are dimensioned and shaped so that an output beam, reflected from the second beam splitter, has a power independent from the state of polarization of the randomly polarized beam.

23 Claims, 2 Drawing Sheets

ASSEMBLY FOR MONITORING POWER OF RANDOMLY POLARIZED LIGHT

BACKGROUND OF THE DISCLOSURE

1. Field of the Disclosure

This invention relates to an optical system and, in particular, to an optical assembly configured to monitor and measure the power of randomly polarized light.

2. Prior Art Discussion

A light signal propagating along a powerful laser system may vary within a broad range. The instability of the propagating signal detrimentally affects the task to be performed by the laser system and the functionality of the system's components. To monitor the variation of power of light signals, optical laser systems are provided with power monitoring assemblies discussed below.

FIG. 1 illustrates a power monitoring assembly 10 including a pigtailed linearly-polarized isolator 12 configured to support propagation of a light signal Ii between input and output pigtailed fibers 14 and 16, respectively as disclosed in U.S. patent application Ser. No. 12/072,597 commonly owned with the present application and fully incorporated herein by reference. The isolator core 18 is provided with a tap coupler monitor 20 having a plate-shaped beam splitter 22 operative to bleed off a small portion of optical signal which is coupled into a photo-detector 24, 26 for further measurements. The assembly 10 has been successfully used for power readings of a linearly-polarized light.

However, many known optical applications, including fiber laser systems, operate with randomly polarized light which may affect power readings of monitor 20 for the following reasons. When light travels through matter it suffers power loss. One of the contributors to power loss is polarization. As an optical signal passes through at least partly transparent material, the signal's optical power reduces in selective directions due to spatial polarization interaction. In other words, the energy of the light is divided between two polarization states, "p" and "s", which are orthogonal with respect to one another. The state of polarization refers to the distribution of light energy between these two modes. The difference in the loss between the two polarization modes represents the polarization dependent loss (PDL) of the device.

Based on the above, fiber laser systems with randomly-polarized light may, thus, be characterized by different coefficients of reflection (Rp, Rs) of for respective "p" and "s" polarization states of light incident, for example, on plate-shaped beam splitter 22 of assembly 20. As a consequence, the power of the tapped off beam fluctuates depending upon the polarization of the incident light.

The efforts directed to provide plate-shaped beam splitter 22 with a coating, which may remedy the effect of the randomly polarized light by having Rs and Rp match one another with the desired degree of precision, were not successful. The latter can be explained by technological limitations of current devices monitoring light within a range in which a coefficient of reflection R does not exceed a fraction of 1%. Only when the coefficient of reflection R is about 20%, the above relationship between Rp and Rs may be consistently satisfied. But 20% would constitute an unacceptably high loss of power.

FIG. 2 illustrates an alternative configuration of power monitoring assembly. The assembly is configured as a fiber tap or fiber coupler 28. A portion of light guided by a fiber 30 is coupled into a fiber 32 which delivers it to a photo-detector 34. Such a power monitoring assembly is effective at low powers not exceeding about 10 W.

FIG. 3 illustrates still a further configuration of a power monitoring assembly 36 configured to detect power scattered along a length of waveguide 40 (Rayleigh scattering). The scattered light in the core of waveguide 40 is detected by a photodiode 42. However, Rayleigh signals may be rather weak and, thus, require sophisticated detectors. Also, it may be difficult to separate direct and backreflected signals from one another.

A need, therefore, exist for an optical unit receiving a fraction of randomly polarized signal light and capable of optically treating the fraction so that the power of the beam, exiting the unit, is polarization independent.

SUMMARY OF THE INVENTION

The disclosed optical unit allows to effectively meet the above-stated need by the disclosed assembly including a main, first beam splitter, second additional beam splitter and detector unit. The splitters are configured so that a plane of incidence on the partially reflective first surface of the first splitter and a plane of incidence on the reflective second surface of the second splitter are substantially orthogonal to one another. A plane of incidence, as known to one of ordinary skills in the art, is determined by a light beam, incident on a surface, and the normal at the point where the incident beam strikes the surface.

The disclosed configuration, thus, allows an output light, incident on the detector unit, to undergo two subsequent reflections—from the first beam splitter and subsequently from the second beam splitter. Accordingly, the light incident on and reflected from the first surface, for example, in polarization state "p" is further reflected from the second surface in polarization state "s". On the other hand, the light incident on and reflected from the first plate-shaped beam splitter in polarization state "s" will undergo the reflection from the second plate-shaped beam splitter in state "p" Consequently, the light incident on a photodetector, which receives the light from the second surface, is polarization independent since, regardless of the polarization state, the total coefficient of reflection after two reflections is equal to Rs×Rp. Hence, the power fluctuation between two polarization states does not affect the reading of the photodetector provided, of course, the first splitter is configured with coefficients of reflection Rs and Rp identical to respective coefficients Rs and Rp of the second splitter.

BRIEF DESCRIPTION OF THE DRAWINGS

The above and other features and advantages of the disclosure will become more readily apparent from the following specific description accompanied by the drawings, in which.

SPECIFIC DESCRIPTION

Figure 1:
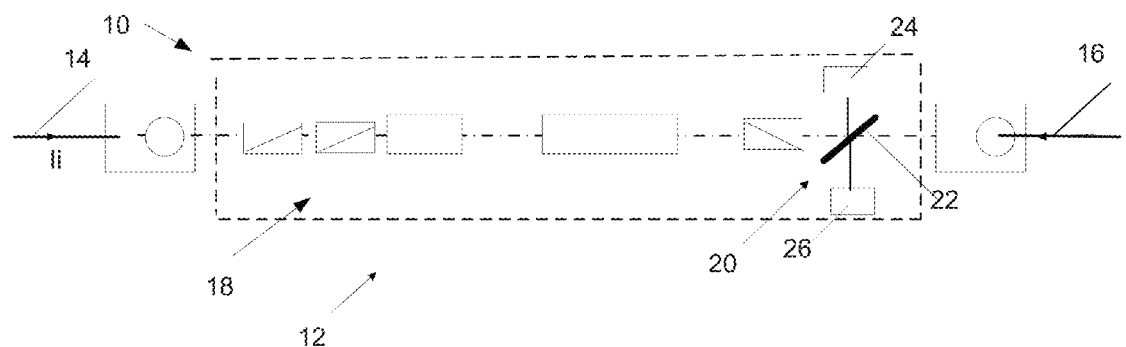
FIG. 1 is one configuration of the known prior art power measuring unit.
Figure 2:
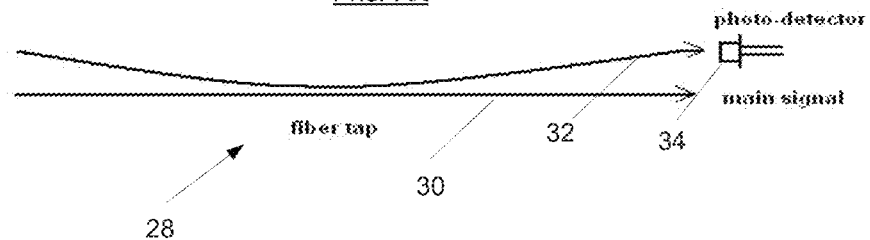
FIG. 2 is another configuration of the known prior art power measuring unit.
Figure 3:
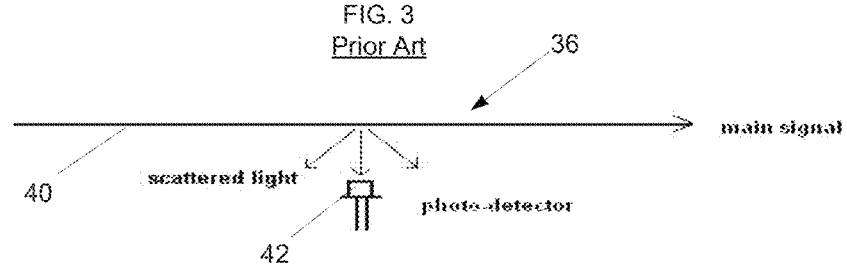
FIG. 3 is a high power fiber laser system incorporating a further configuration of the prior art power measuring unit.

Reference will now be made in detail to the disclosed power monitoring unit and fiber laser system incorporating the power measuring unit. Wherever possible, same or similar reference numerals are used in the drawings and the description to refer to the same or like parts or steps. The drawings are in simplified form and are far from precise scale.

Figure 4:
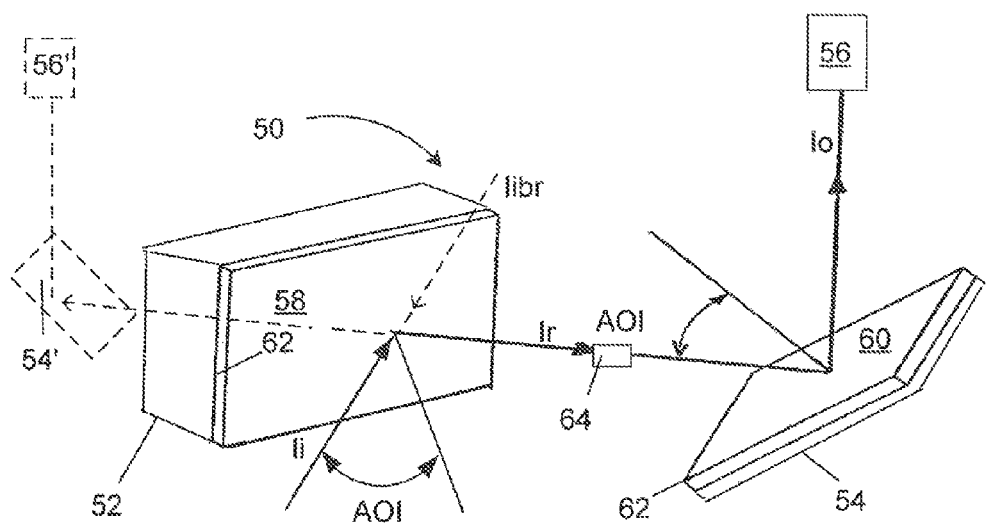
FIG. 4 is a power measuring unit configured in accordance with the disclosure.

FIG. 4 illustrates a power measuring optical unit 50 that may be utilized in any optical system requiring the power measurement of randomly polarized light. The unit 50 includes a first beam splitter 52, a second beam splitter 54 and a detecting assembly 56. When a signal randomly polarized light beam Ii strikes a partially reflecting surface 58 of first plate-shaped beam splitter 52, a fraction thereof, which preferably, but not necessarily, does not exceed a percent of light beam Ii, is reflected, and the rest of it is transmitted. The reflected fraction Ir of light Ii depends on both the angle of incidence and the polarization direction of the incident light. If detecting assembly 56 were located immediately after first splitter 52 along a measuring light path, the measured power would fluctuate depending on whether incident Ii and, therefore, reflected light Ir was in an "s" or "p" polarization state.

Accordingly, disclosed optical unit 50 eliminates the dependence of the power measuring data from the state of polarization of light beam Ii by incorporating second beam splitter 54 which is configured with a partially reflecting surface 60. The first and second splitters 52 and 54, respectively, are so positioned relative to one another that a first plane of incidence including light Ii on a surface 58 of first splitter 52 is substantially orthogonal to a second plane of incidence of reflected light Ir on a surface 60 of second beam splitter 54. The first plane of incidence is determined by light Ii and normal $N_1$ to the light stricken point on surface 58 of first splitter 52 which define therebetween a first angle of incidence $AOI_1$. Likewise, the second plane of incidence is determined by light Ir, incident on surface 60, and normal $N_2$ defining therebetween a second angle of incidence $AOI_2$. As readily realized by one of ordinary skills in the optical arts, the most preferable configuration of inventive unit 50 includes a right angle between the above-disclosed planes. However the angle between the planes may vary ranging between about 85° and 95° without critically affecting the desired precision of measurement.

A polarization vector of initial randomly polarized light Ii includes two orthogonal components E1 and E2, as well known to one of ordinary skills. Upon being sequentially reflected from first 52 and second 54 beam splitters, the components E1 and E2 can be characterized by respective full coefficients of reflection $R_{E1}$ and $R_{E2}$. The power of output light beam Io incident upon detecting assembly 56 is polarization independent if the total coefficients of reflection $R_{E1}$ and $R_{E2}$ are the same, i.e. $R_{E1}=R_{E2}$. This requirement is met by splitters 52 and 54 each having a pair of coefficients Rp for "p" polarized state and coefficient Rs for "s" polarized light, wherein coefficients Rp and Rs of first splitter 52 are substantially equal to respective Rp and Rs of second splitter 54.

Assume, for example, that E1 component of main light Ii has an "s" polarization state and, thus, is characterized by an Rs coefficient of reflection from first beam splitter 52. Since beam splitters 52 and 54 have substantially the uniform optical configuration, the "s" polarization state of component E1 reflected from first splitter 52 is shifted to the "p" polarization state with respective coefficient of reflection Rp as a result of its reflection from second splitter 54. Thus, the full coefficient of reflection $R_{E1}$ at the input of detecting assembly 56 can be determined as Rs×Rp.

When the E2 component of light Ii, reflected from first splitter 52, further bounces off splitter 54, its "p" polarization state rotates into "s" polarization state. The full coefficient of reflection of $R_{E2}$, like the coefficient $R_{E1}$, is also determined as Rp×Rs. Hence, the fluctuation of the power between two polarization states does not affect the reading of detection assembly 56. Of course, disclosed unit 50 may measure light power in both forward and backward transmitting directions of randomly polarized light through the first splitter 52, with the backreflected light Iibr being shown in phantom lines. The measurement of the back-reflected light Iibr will require an additional plate-shaped beam splitter 54' configured similar to plate-shaped beam splitter 54 and detecting assembly 56' as shown in phantom lines.

The essential conditions for achieving a polarization independent power reading of the disclosed unit include the following:

Uniform coefficient of reflection Rs for both splitters and uniform coefficient of reflection Rp for both splitters. In principle, this condition is sufficient for the realization of the disclosed concept.

Substantial orthogonality of the planes of incidence of light Ii on surface 58 of splitter 52 and light Ir on surface 60 of second splitter 54.

Desirably, substantial uniformity of angle of incidence (AOI) of light Ii on plate-shaped beam splitter 52 and the AOI of reflected light Ir upon second plate-shaped beam splitter 54; technologically, the AOI may vary within a range, but preferably the AOI is 45°. However the AOI may not be equal to one another at all.

To prevent light beam Ii, which is transmitted through first plate-shaped beam splitter 52, from a substantial power loss, plate-shaped beam splitters 52 and 54 each may be covered an anti-reflection (AR) coating 62. The coating 62 preferably is configured so that reflected and output lights Ir and Io, respectively, each are attenuated at approximately 20-30 dB. The total attenuation in arrange between about 40 to 60 dB can be beneficial to the operation of the photo-detector of detection assembly 56. For example, if input light Ii has a power of about 100 W, the above mentioned attenuation range allows the photodetector to work in a linear regime.

The unit 50 may also be configured with a polarization managing component 64 that may include, for example, half-wave plate or 90° retarder. The half-wave plate, as known to one of ordinary skills in the optical arts, is configured to retard one polarization component relative to the other one by half a wavelength. The 90 degree retarder rotates polarization at 90 degrees. In other words, regardless of a position between surfaces 58 and 60 relative to one another, component 64, if impinged upon by light Ir, will rotate one polarization component into another. Also, typically, optical circuitries are configured so that a light beam propagates in one, preferably horizontal plane. The unit 50, if configured without plate 64, provides for the propagation of the light beam in vertical and horizontal planes and, thus, can be considered as a 3-D dimensional configuration. The incorporation of polarization managing component 64 allows second plate-shaped beam splitter 54 to be located so at to route output beam Io in the same, for example, horizontal plane as the rest of the light beams.

Figure 5:
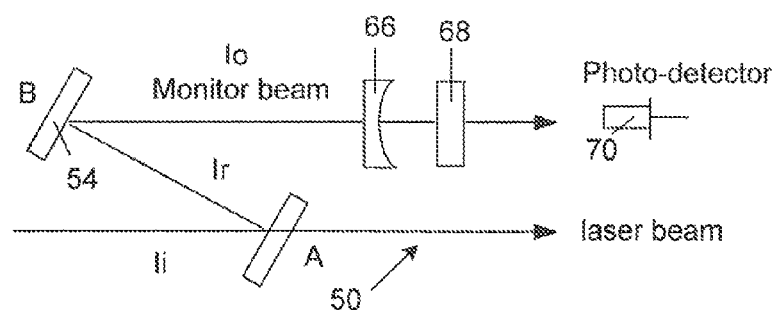
FIG. 5 is a diagrammatic view of bulk optics utilized in the power measuring unit of FIG. 4.

Referring to FIG. 5, unit 50 may have additional components configured to even further attenuate the reflected beams Ir and Io, respectively. One of the configurations may include negative spherical bulk optics 66. Still a further configuration of unit 50 may have a light-dispersion plate 68. The power attenuating bulk component is, of course, located next to a photodetector 70 of detecting assembly 56.

The disclosed unit 50 may be manufactured as a separate component or as an integral component of optical system. For example, the optical system may be configured as a pigtailed isolator which includes a housing enclosing a 45° optical retarder, a Faraday rotator, an output polarizer and input and output collimators. In other words unit 50 may be incorporated in the isolator 120 shown highly diagrammatically. As known to one of ordinary skills in the optical arts, isolator 120 configured to process a randomly polarized light is based on a structure operative to split two orthogonal polarizations into two light beams and further combine them.

Figure 6:
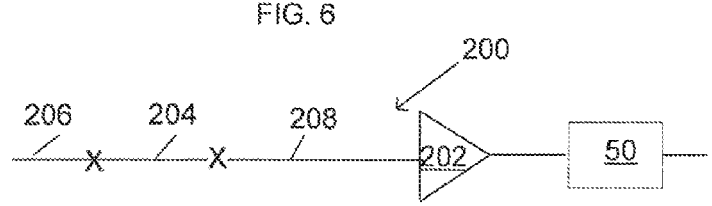
FIG. 6 is a diagrammatic view of exemplary fiber laser system incorporating the disclosed measuring optical unit.

Referring to FIG. 6, advantageously, unit 50 is incorporated in a high-power fiber laser (HPFL) system 200. The system 200 may have limitless configurations and, thus, the one illustrated in FIG. 6 is a diagrammatic view of exemplary fiber laser system. The System 200 may have one or a plurality of cascades 202. Preferably, cascades 202 each is configured with a gain block including an active fiber 204, i.e., a fiber doped with ions of rare earth or transitional metals, and input and output passive fibers 206 and 208, respectively. Each of the opposite ends of active fiber 204 is fused to the passive fiber. Preferably, but not necessarily, active fiber 204 has a multi mode core capable of supporting a fundamental mode at the desired wavelength. To provide substantially lossless coupling of light from one fiber into another, all fibers have a geometry allowing for substantial mode matching between the active and each of the passive fibers. The unit 50 may be located between the subsequent cascades or/and along the output end of system 200.

As can be apparent to artisans, various modifications and variations can be made in the presently disclosed laser powerful system. Thus, it is intended that the present disclosure cover the modifications and variations of this disclosure provided they come within the scope of the appended claims and their equivalents.

The invention claimed is:

1. A unit for measuring a power of randomly polarized light beam comprising:
  a first beam splitter having a partially reflective surface which transmits the randomly polarized light beam incident thereupon at a first angle, the partially reflective surface reflecting a fraction of the randomly polarized light beam;
  a second beam splitter spaced from the first beam splitter and having a partially reflective surface which intercepts the fraction incident thereon at a second angle different from the first angle, the first and second beam splitters being configured so that an output beam, reflected from the second beam splitter, has a power independent from a state of polarization of the fraction of the randomly polarized beam; and
  an optical assembly operative to detect the output beam and measure the power thereof proportional to a power of the randomly polarized beam.

2. The unit of claim 1, wherein the randomly polarized light beam and reflected fraction propagate in respective planes which are substantially orthogonal to one another.

3. The unit of claim 2, wherein the first and second beam splitters each are configured with indices of reflection Rs and Rp, wherein the Rs is a coefficient of reflection for an "s" state of polarization and the Rp is a coefficient of reflection for a "p" state of polarization, the Rs and Rp of the first beam splitter being substantially identical to respective Rs and Rp of the second beam splitter for a given angle of incidence (AOI).

4. The unit of claim 3, wherein a resulting coefficient of reflection for the output light beam is equal to Rs×Rp regardless of whether the randomly polarized light in the "s" or "p" state of polarization.

5. The unit of claim 1 further comprising bulk optics located between the second beam splitter and optical assembly, the bulk optics being configured to weaken the power of the output beam and simplify a positioning of a detector of the optical assembly in a path of the twice reflected fraction of light, the detector being selected from the group consisting of a negative spherical lens and light scattering optics.

6. The unit of claim 2, wherein the partially reflective surfaces of the respective first and second beam splitters are covered by respective antireflection coatings configured so that the twice reflected fraction of light is attenuated so that the optical assembly for measuring the light power operates in a linear regime.

7. The unit of claim 1 further comprising:
  an additional second beam splitter, which is in optical communication with the first beam splitter receiving a randomly polarized backreflected light beam that propagates in a direction opposite to a direction of the randomly polarized light beam transmitted through the first beam splitter, the additional second beam splitter receives a fraction of the backreflected light beam reflected from the first beam splitter, and
  an additional optical assembly provided for receiving and measuring a power of backreflected light beam independent from a state of polarization of the fraction of the backreflected light transmitted through the first beam splitter.

8. The unit of claim 1 further comprising a polarization managing component between the first and second beam splitters, the polarization managing component being selected from the group consisting of a half-wave plate and 90° retarder.

9. A pigtailed optical isolator, comprising:
  an isolator core traversed by a forward propagating randomly polarized beam along a light path; and
  a power measuring unit located along a second stretch of the core and including:
    spaced first and second beam splitters configured to sequentially reflect a fraction of the randomly polarized beam so that an output beam, reflected from the second beam splitter, has a power independent from a state of polarization of the randomly polarized beam incident upon the first splitter, the first and second beam splitters having respective partially reflective surfaces configured so that an angle of incidence ("AOI") of the randomly polarized light beam on the surface of the first beam splitter is different from that of the fraction incident on the surface of the second beam splitter; and
    an optical assembly operative to detect the output beam and measure the power thereof proportional to a power of the randomly polarized beam.

10. The optical isolator of claim 9 further comprising a polarization managing component located between the first and second beam splitters and selected from a half-wave plate or a 90° retarder.

11. The optical isolator of claim 9, wherein the first and second beam splitters are located relative one another so that a plane of incidence, including the randomly polarized beam, on a partially reflective first surface of the first splitter is substantially orthogonal to a plane of incidence of the fraction light, which is reflected from the first surface, on a second partially reflective surface of the second splitter.

12. The optical isolator of claim 11, wherein the first and second beam splitters each are configured with indices of reflection Rs and Rp, wherein the Rs is a coefficient of reflection for an "s" state of polarization lying orthogonal to the plane of incidence (POI) and the Rp is a coefficient of reflection for a "p" state of polarization lying in the POI, the Rs and Rp of the first beam splitter being substantially identical to respective Rs and Rp of the second beam splitter for chosen AOI.

13. The optical isolator of claim 11, wherein the reflective surfaces of the respective first and second beam splitters each are covered by an antireflection coating configured to attenuate the fraction of the randomly polarized light beam at a working wavelength.

14. The optical isolator of claim 9 further comprising a light-attenuating component located between the second beam splitter and detector and selected from the group consisting of negative spherical bulk optics and a light-dispersion plate.

15. A high power fiber laser system, comprising:
at least one amplifying cascade operative to amplify randomly polarized input light beam propagating along a path; and
a unit for measuring a power of the amplified randomly polarized light beam in optical communication with the amplifying cascade, the unit comprising:
spaced first and second beam splitters configured to sequentially reflect a fraction of the randomly polarized light so that an output light beam, reflected from the second beam splitter, has a power independent from a state of polarization of the randomly polarized light incident upon the first splitter the first and second beam splitters having respective partially reflective surfaces configured so that an angle of incidence of the randomly polarized light beam on the surface of the first beam splitter is different from that of the fraction incident on the surface of the second beam splitter; and
an optical assembly operative to detect the output beam and measure the power thereof proportional to a power of the randomly polarized light.

16. The HPFL system of claim 15, wherein the fraction of the input light beam reflected from the first beam splitter extends in a plane of incidence substantially orthogonal to a pane of incidence of the input light beam upon the first beam splitter, the first and second beam splitters each are configured with indices of reflection Rs and Rp, wherein the Rs is a coefficient of reflection for an "s" state of polarization and the Rp is a coefficient of reflection for a "p" state of polarization, the Rs and Rp of the first beam splitter being substantially identical to respective Rs and Rp of the second beam splitter for a given AOI so that a resulting coefficient of reflection for the output light beam is equal to Rs×Rp regardless of whether the randomly polarized light in the "s" or "p" state of polarization.

17. A unit for measuring a power of randomly polarized light beam comprising:
spaced first and second beam splitters configured with respective partially reflective surfaces which are located to sequentially reflect a fraction of the randomly polarized beam so that an output beam, reflected from the second beam splitter, has a power independent from a state of polarization of the fraction reflected from the first splitter;
an optical assembly operative to detect the output beam and measure the power thereof proportional to a power of the randomly polarized beam; and
anti-reflection coatings provided on respective partially reflective surfaces and configured to sequentially attenuate the reflected fraction so that the optical assembly operates in a linear regime.

18. The unit of claim 17, wherein the first and second beam splitters are located relative one another so that a plane of incidence, including the randomly polarized beam, on the partially reflective first surface of the first splitter is substantially orthogonal to that of the fraction light incident on the partially reflective surface of the second splitter.

19. The unit of claim 18, wherein the reflective surfaces are positioned so that an angle of incidence (AOI) of the randomly polarized beam on the first beam splitter is substantially equal to an AOI of the fraction of randomly polarized light beam which is reflected from the first splitter and incident upon the second splitter.

20. The unit of claim 18, wherein the reflective surfaces are positioned so that an angle of incidence (AOI) of the randomly polarized beam on the first beam splitter is different from an AOI of the fraction of randomly polarized light beam which is reflected from the first splitter and incident upon the second splitter.

21. A pigtailed optical isolator, comprising:
an isolator core traversed by a forward propagating randomly polarized beam along a light path; and
a power measuring unit located along a second stretch of the core and including:
spaced first and second beam splitters configured to sequentially reflect a fraction of the randomly polarized beam so that an output beam, reflected from the second beam splitter, has a power independent from a state of polarization of the fraction reflected from the first splitter, the first and second beam splitter being provided with respective partially reflective surfaces opposing one another;
an optical assembly operative to detect the output beam and measure the power thereof proportional to a power of the randomly polarized beam; and
anti-reflection coatings provided on respective partially reflective surfaces and configured to sequentially attenuate the reflected fraction so that the optical assembly operates in a linear regime.

22. The unit of claim 21, wherein the reflective surfaces are positioned so that an angle of incidence (AOI) of the randomly polarized beam on the partially reflective surface of first beam splitter is substantially equal to an AOI of the fraction of randomly polarized light beam incident upon the second splitter.

23. The unit of claim 21, wherein the reflective surfaces are positioned so that an angle of incidence (AOI) of the randomly polarized beam on the first beam splitter is different from an AOI of the fraction of randomly polarized light beam which is reflected from the first splitter and incident upon the second splitter.

* * * * *